May 29, 1956

E. J. HOUDRY 2,747,976

SURFACE TYPE CATALYSIS

Filed May 10, 1951

INVENTOR.
EUGENE J. HOUDRY
BY
Ira L. Nickerson
ATTORNEY

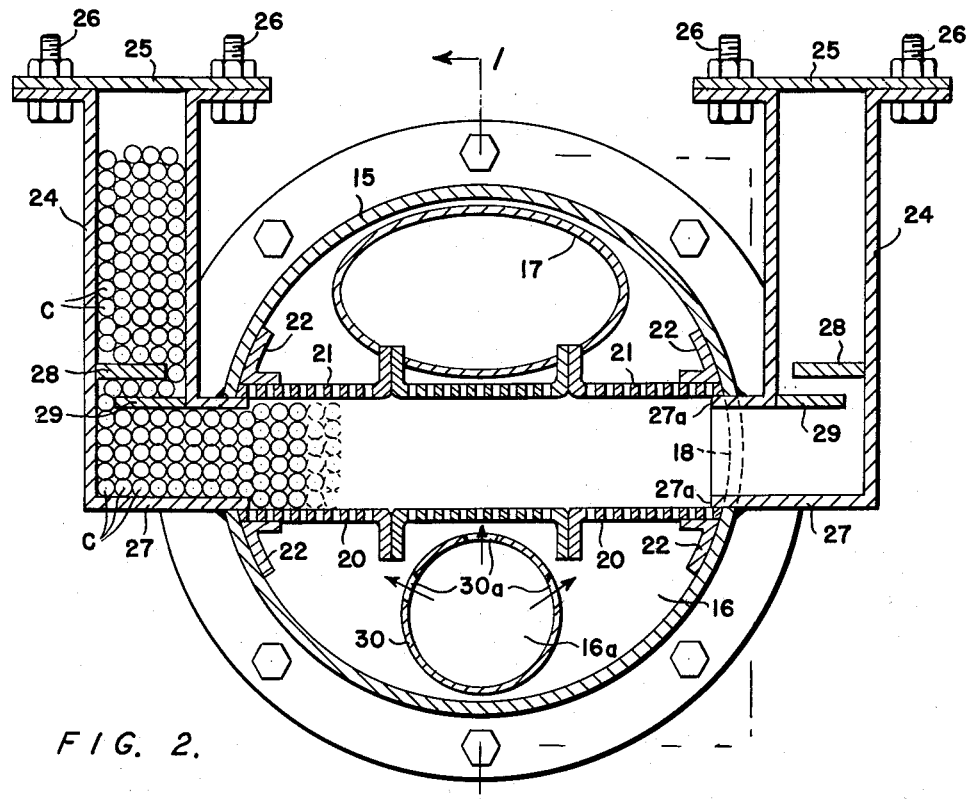
FIG. 2.
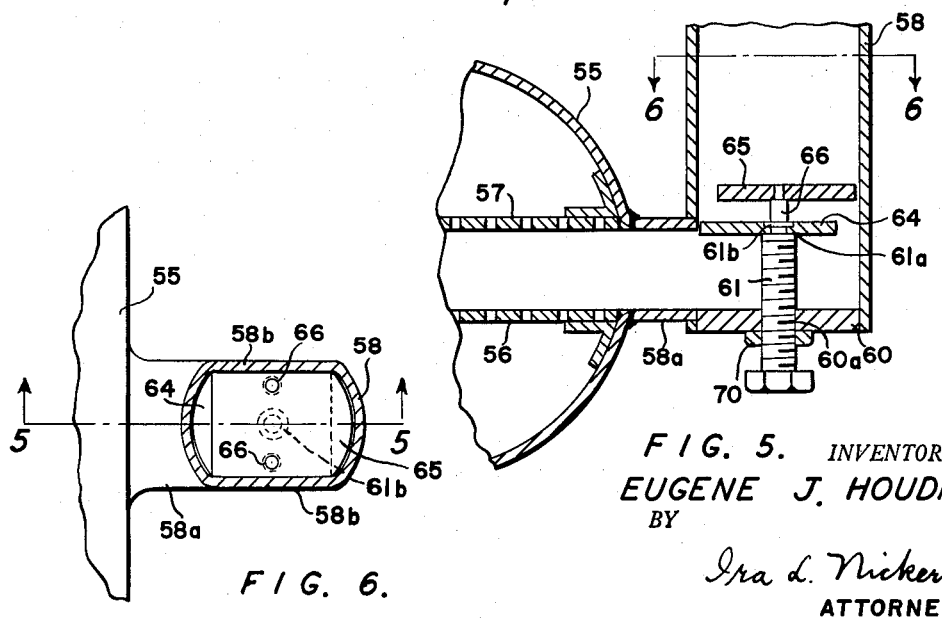
FIG. 6.
FIG. 5.
INVENTOR.
EUGENE J. HOUDRY
BY
Ira L. Nickerson
ATTORNEY.

May 29, 1956  E. J. HOUDRY  2,747,976
SURFACE TYPE CATALYSIS
Filed May 10, 1951  3 Sheets-Sheet 3

INVENTOR.
EUGENE J. HOUDRY
BY
Ira L. Nickerson
ATTORNEY.

United States Patent Office 2,747,976
Patented May 29, 1956

2,747,976

SURFACE TYPE CATALYSIS

Eugene J. Houdry, Ardmore, Pa., assignor to Oxy-Catalyst, Inc., a corporation of Pennsylvania Application May 10, 1951, Serial No. 225,498

6 Claims. (Cl. 23—288)

This invention relates to catalysis and to catalytic operations conducted with catalysts in discrete form. It is concerned with catalytic operations of the surface type and with the maintenance of the activity of the catalyst under very severe conditions of use. While capable of general application the invention has an important use in the promotion of oxidizing reactions, particularly in converting the noxious and poisonous fumes resulting from incomplete combustion of burnable material, as the exhaust fumes of internal combustion engines, into non-odorous and non-poisonous compounds.

The activity of catalysts is often impaired by deposits which form thereon as a result of the reaction, of the presence of contaminants in the reactants, or of rust or other substances dislodged from portions of the apparatus, etc. As disclosed in the copending application of William M. Bowen III and myself, Serial No. 219,623 filed April 6, 1951, such deposits can be continuously removed from the surface of discrete catalysts by disposing the catalyst in a horizontal layer and by vibrating or agitating the converter so that the pieces of catalyst are caused to vibrate and dance, turning and rubbing against one another. This rubbing action has the effect of continually providing a fresh catalyst surface but gradually wears away the pieces of catalyst. Such losses by attrition can be made up by automatic feeding of additional catalyst into the horizontal layer of catalyst to keep it at uniform depth. Apparatus and converters such as shown in the aforesaid copending application, when used for oxidizing reactions, as to clean the exhaust fumes of engines, operate very satisfactorily so long as the layers of catalyst are maintained in horizontal or in close to horizontal position and so long as the vibratory action is relatively mild and without frequent jolts and sudden shocks. In other words, they are particularly suitable for stationary engines, for engines used on rail vehicles, etc. The present invention represents in certain respects a further development of and improvements upon that disclosed in the aforesaid copending application.

It is an object of the present invention to improve and to further develop catalytic operations and apparatus so as to extend their use and enhance their value. Another object is to provide catalytic apparatus which will operate efficiently for long periods and under the most severe conditions. Another object is to control and to restrict gravity feeding of discrete catalyst from a reservoir of catalyst to a catalytic chamber. Another object is to provide catalytic oxidizing apparatus for cleaning the engine exhaust fumes of road, land, water, and air-borne vehicles. Still another object is to prevent tight packing of discrete catalyst in the catalyst chamber regardless of constant and even violent movement, angular and otherwise, of the converter. Still another object is to provide an adequate reverse supply of catalyst to be fed automatically to the catalytic chamber or chambers but under positive and restricted control. Still other objects will be apparent from the detailed description which follows.

In accordance with the present invention suitable means are provided to restrict and to control the passage of the pieces of catalyst from the reserve supply or hopper to the layer of catalyst in the catalytic chamber. Baffling at the outlet of the hopper gives desirable results. The means may take the form of spaced baffles having feed openings offset from one another so that direct movement of catalyst from hopper to layer is sharply restricted and the feeding is effected in at least two steps or stages depending upon the number of baffles employed. By preference there will be at least one intermediate chamber of restricted depth and capacity interposed between the supply chamber or hopper and the catalytic zone so that feeding will be confined to one piece or to one row of catalyst pieces at a time regardless of the angular variation of the catalytic chamber from its normal horizontal position. Such provision together with proper disposition of the final feeding opening or outlet with reference to the upper grid of the catalyst chamber insures that the latter will never be completely filled or tightly packed with catalyst, so that there can be sufficient relative movement of the individual pieces to clear their surfaces of dust and other deposits. In some installations it is advantageous to make provision for some adjustment of the catalyst feeding means. When the catalyst chamber is of substantial length it is also advantageous to provide one or more transverse partitions; the latter arrangement performs the double function of minimizing the tendency of the catalyst to pack and at the same time avoids, or at least greatly reduces, the possibility of by-passing of the catalyst by reactants at times of extreme tilting of the converter or of extreme sidewise movement of the catalytic mass, as under centrifugal force when a vehicle on which the converter is mounted rounds a curve at high speed, etc. By preference the discrete catalyst occupies at least 90 per cent of the space within the catalyst chamber and may occupy up to 98 per cent of such space. The catalytic section of the exhaust cleaner may be followed by a muffler section having means for alternately baffling and then expanding the gases to reduce noise. A trap for solid particles, catalyst fines, etc. may be provided in such muffler section. The velocity of the reactants (mingled fumes and air) calculated at 60° F. at entry to the bed of catalyst is controlled so as not to exceed one and a half feet per second at idling speed of the engine with a preferential velocity in the range of one-half to one foot per second. Feeding of reactants into the chamber beneath the layer of catalyst assists, and sometimes obviates the necessity for, vibration of the converter to effect the requisite movement and rubbing action of the pieces of catalyst upon one another, particularly when the volume and velocity of the reactants is sufficient to raise the layer of catalyst pieces above the lower support or grid and to maintain them in a state of partial suspension.

In order to illustrate the invention and the manner of its operation, concrete embodiments of apparatus for practicing the invention are shown in the accompanying drawings, in which:

Fig. 2 is a transverse sectional view on the line 2—2 of Fig. 1, showing a part of the catalyst in place;

Fig. 5 is a fragmentary vertical sectional view on the line 5—5 of Fig. 6 showing a modification which provides for adjustment of the catalyst feeding means; and Fig. 6 is a horizontal sectional view on the line 6—6 of Fig. 5.

Figure 1:
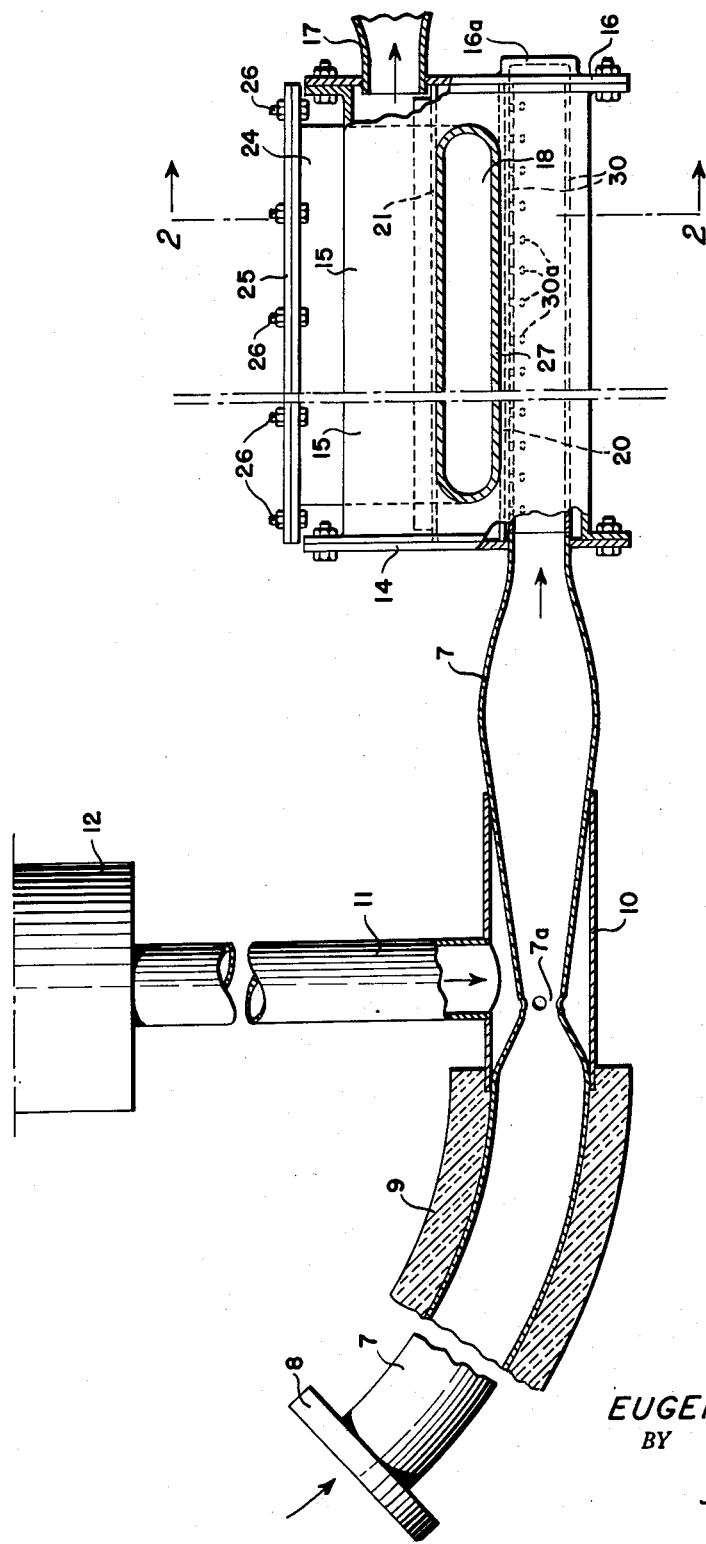
Fig. 1 is a side elevational view partly broken away and partly in section in two planes as indicated by the offset section line 1—1 of Fig. 2, the catalyst being omitted.

In Fig. 1 the apparatus shown comprises a conduit 7 having a flanged end 8 for attachment to the exhaust manifold of an internal combustion engine. When the exhaust cleaner and muffler is at a considerable distance from the engine, conduit 7 will be covered with a thick layer of insulating material 9. Beyond the insulation conduit 7 is constricted, as at 7a, to form a venturi throat through the ports of which oxygen bearing gas such as air is admitted from a surrounding chamber defined by outer casing 10, the chamber being supplied with air by a conduit 11 which may be provided with an air filter 12 of any suitable or desired type at its inlet end. Conduit 7 beyond venturi 7a extends through the end plate 14 of an elongate catalytic converter 15 to deliver therein the exhaust fumes of the engine, mingled with air, for elimination of carbon monoxide and other poisonous or malodorous components by a catalytic oxidizing reaction. Converter 15 may be of any suitable or desired shape. As shown it is cylindrical in cross section (Fig. 2) with flanged ends to which end plates 14 and 16 are suitably secured, as by bolts. Reactant products are discharged from the upper portion of the converter through an outlet conduit 17 secured to end plate 16.

The interior of converter 15 is spanned throughout its length and width by a lower apertured support or grid 20 and by an upper grid 21, these two spaced grids providing therebetween a catalyst chamber adapted to contain oxidizing catalyst c in discrete form, preferably in pellets or molded pieces of uniform size. The grids 20 and 21 may be made up of flanged sections with their flanges in abutting relation suitably secured together, as by welding, and may be secured in place in any suitable manner, as to angle brackets 22 attached to the inner wall of converter 15. The space between lower apertured support 20 and upper grid 21 will be substantially filled with catalyst, as in the range of 90 to 98 per cent of the volume of the space indicated, the free space left being only sufficient to permit a relatively slight vibratory movement of the individual pieces of catalyst so as to cause sufficient rubbing of the surfaces to clear the same of deposits. Excessive relative movement of the pieces of catalyst is to be avoided in order to cut down losses from attrition. Hence it is important to maintain the desired level or volume of the catalyst substantially constant while the apparatus is in use. Accordingly small amounts of catalyst may be fed into the catalytic mass as required, otherwise there can be rapid wearing away of the catalyst pieces as soon as the catalyst level falls sufficiently to permit violent movements and impacts. In the form of the invention shown in Figs. 1 and 2 a reserve supply or reservoir of catalyst is provided by a hopper 24 at each side of converter 15. Each hopper 24 is disposed vertically for gravity feed of the catalyst pieces and the upper end of each has a closure plate 25 secured thereto as by bolts 26. Each hopper is of substantial length and has a laterally extending portion 27 shaped to fit and to extend within a side opening 18 in converter 15, the lateral extension 27 of each hopper 24 projecting into the catalyst chamber formed by grids 20 and 21, as clearly shown in Fig. 2, and forming opposing shoulders 27a at opposite sides of the catalyst chamber.

In order to restrict the free flow of catalyst from hoppers 24 into the catalyst chamber, or out of the catalyst chamber into one or the other of the hoppers when there is extreme tilting of the converter from its normal position with grids 20 and 21 horizontally disposed, hoppers 24 are provided with suitable baffling means, such as upper and lower baffles 28 and 29 respectively. While more than two baffles can be used, it has been found that two are sufficient. The baffle plates extend the length of hoppers 24 but not entirely across the width of the hoppers, the gaps or openings thus provided are not in line but are offset from one another and normally of such extent as to permit one piece of catalyst, or rather one longitudinal row of catalyst pieces to pass downwardly as space below becomes available. The spacing between baffle plates 28 and 29 is usually only slightly greater than the largest diameter of a single piece of catalyst so as sharply to restrict the quantity of catalyst in the intermediate chamber formed by the baffles. Hence the arrangement of baffles is such as to hold back the great mass of catalyst and to cause lateral movement of a restricted quantity of catalyst between two locations where vertical movement by gravity is permissible.

As is apparent in Fig. 1 the reactants are discharged by conduit 7 into the lower part of elongate converter 15 to pass upwardly through the grids 20 and 21 and the intervening mass or layer of catalyst c, and then out through discharge pipe 17. In order that all portions of the catalytic mass may be brought quickly to operating temperature it is desirable to discharge the reactants in a substantially uniform manner and with a minimum loss of heat adjacent to all parts of the layer of catalyst. To this end suitable distributing means are provided beneath the catalyst chamber and extending the length thereof. In its preferred form such means takes the form of a conduit 30 of suitable material such as light metal tubing which may be integral with or attached to conduit 7 and which has a series of apertures 30a in its upper side directing the reactants toward lower grid 20 (Fig. 2). Distributing conduit 30 is suitably supported at its free end which may be closed if desired; a preferred arrangement is to leave its free end open but to have it extend with a sliding fit into the inner shallow bore or recess provided by a hollow boss or projection 16a (Fig. 1) pressed into or otherwise formed on end plate 16, such boss forming a sufficient closure for the end of tube 30 and permitting expansion and contraction of tube 30 under temperature changes.

Figure 3:
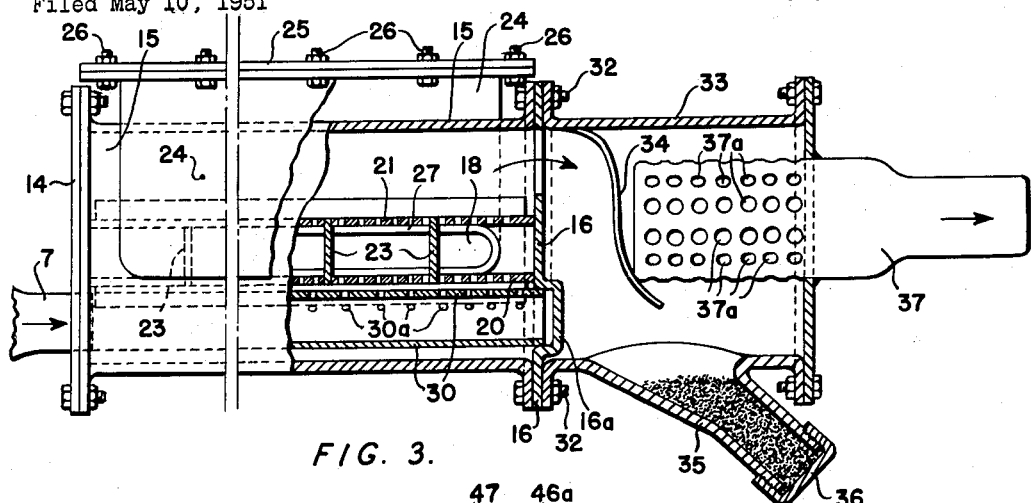
Fig. 3 is a longitudinal vertical sectional view of a modification of the invention partly broken away and showing portions in elevation, catalyst being omitted.

Fig. 3 shows a catalytic converter for engine exhaust fumes followed by apparatus for muffling sound and for segregating solid particles from the gaseous stream.

Except for transverse partitions 23 extending across the catalyst chamber, discussed in the next paragraph, the converter shown in Fig. 3 is identical with the converter shown in Figs. 1 and 2 and similar parts are designated by the same reference characters. Secured to the converter 15 and against the intervening end plate 16 thereof, as by bolts 32, is a flanged muffler section 33 of suitable size and shape. As shown it is cylindrical in form and is provided with means for alternately compressing and expanding the reactant products leaving the upper portion of converter 15 through the exhaust opening in end plate 16. The reactant products impinge against a baffle plate 34 within section 33 which directs the products downwardly, thus diverting any solid particles of deposit, catalyst fines, etc., into a well or pocket 35, the lower end of which is closed by screw cap 36. The gaseous products on passing beyond the lower end of baffle plate 34 expand into the chamber beyond baffle 34 and make their way through a series of relatively small holes 37a in the inwardly projecting end of discharge pipe 37 and then pass to atmosphere.

Referring now to the partitions 23 (Fig. 3) extending across the catalyst chamber of converter 15, their function is to divide the long catalyst chamber into a suitable number of relatively small parts or sections, having due regard to the depth of the layer of catalyst to be maintained in the chamber. In most instances these parts or sections will not exceed six inches in length and each will by preference be arranged to have catalyst fed thereto from hoppers 24. By properly determining the size of these parts or sections with reference to the depth of catalyst therein, tilting of the converter (as when the vehicle is climbing hills or running down grades or at an angle sidewise) and the consequent movement of the catalyst will not uncover the lower or supporting grid 20.

Thus there will be no by-passing of the catalyst by the reactants in normal use.

Figure 4:
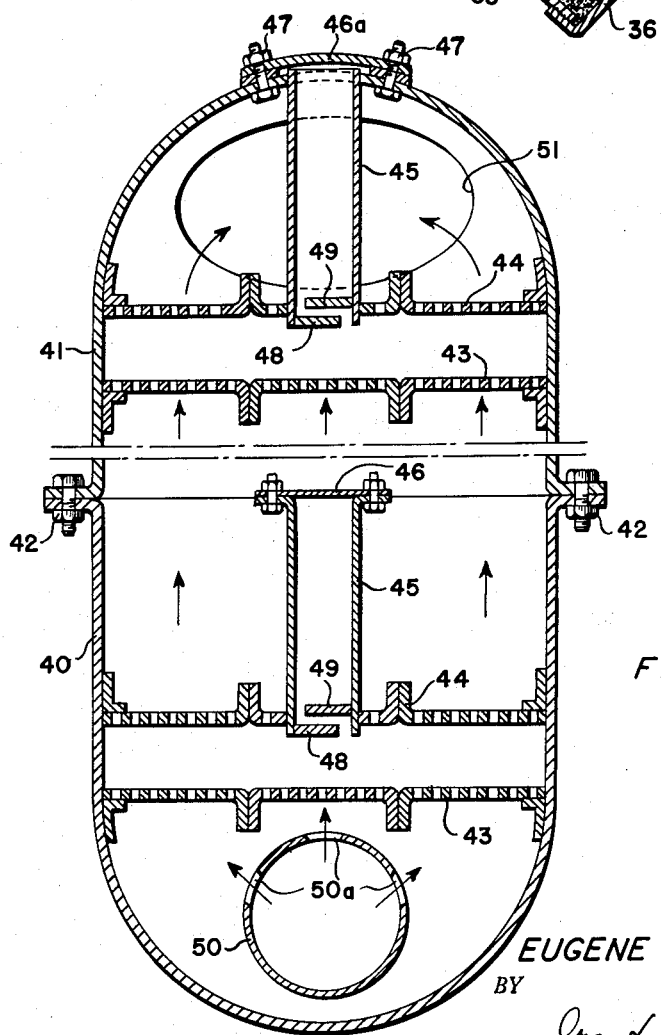
Fig. 4 is a transverse vertical sectional view of another modification, also omitting catalyst.

In the modification shown in Fig. 4 provision is made for serial movement of reactants through two beds or layers of catalyst in a single converter. In this instance the converter is made up of lower and upper deeply recessed parts 40 and 41 having flanged portions secured together by bolts 42 to provide a deep chamber. Each part is spanned by a pair of spaced apart horizontally disposed grids 43 and 44 forming a catalyst chamber for containing a layer of discrete catalytic material. Each catalyst chamber is arranged to have catalyst fed thereto in restricted amount to replace attrition losses from one or more hoppers 45. The upper end of each hopper in part 40 is arranged to be closed by plate 46 bolted in place on the hopper. Each of hoppers 45 in upper part 41 has an open end extending through the upper portion of the part 41 over which a curved plate 46a is fastened to part 41, as by bolts 47. The lower end of each hopper 45 is arranged for restricted and controlled feeding of catalyst through offset openings in parallel spaced baffles 48 and 49 after the manner already described in connection with the arrangement shown in Fig. 2, except that hoppers 45 feed into the central portion of the catalyst chamber rather than into the sides as shown in Fig. 2. Lower converter part 40 has an inlet (not shown) at its lower end and a distributing conduit 50 beneath its catalyst chamber for the full length thereof, conduit 50 having ports 50a for directing the reactants at substantially constant temperature upwardly to pass through both beds of catalyst. The upper part 41 of the converter has an outlet opening 51 for the exit of reactants products. In this arrangement it will be apparent that reactants admitted to and distributed throughout the lower portion of the converter must pass through both catalyst chambers in series before they can leave the converter through discharge opening 51.

The modification of the invention shown in Figs. 5 and 6 shows a hopper for containing a supply of catalyst attached to the side of a converter of the type illustrated in Figs. 1–3 and having adjustable means for feeding the catalyst in restricted amount. As shown, the converter wall is at 55, the spaced grids forming the catalyst chamber are at 56 and 57 (Fig. 5). The hopper 58, of which the lower end only is shown, has a lateral portion 58a which is attached to converter 55 and opens into the catalyst chamber. The hopper may be annular in cross section but if so is preferably flattened at its sides as indicated at 58b (Fig. 6). The mechanism for control of catalyst feeding is adapted to be inserted into the lower open end of hopper 58 and as shown in Fig. 5 comprises a closure plate 60 for such end, to be welded or otherwise secured in place. Plate 60 has a central threaded opening 60a receiving a threaded bolt 61 adjustably to support at its upper end baffle plates 64 and 65 which are secured together in spaced relation to one another by two posts 66. Baffle plates 64 and 65 span the interior of hopper 58 and are restrained against turning by the flattened or straight sides 58b of the latter. Each of baffle plates 64 and 65 provides a gap or opening, and such gaps are offset from one another as indicated in previous forms of the invention, to effect downward movement from one end of upper baffle 65 into the space between the two baffle plates, then lateral movement across lower baffle plate 64, until the catalyst drops one or two at a time through the gap provided in the latter plate. The upper end of threaded post 61 is reduced to form a shoulder 61a upon which lower baffle plate 64 rests, and this reduced end is subsequently flattened out or has a washer 61b attached thereto at its upper end to seat in a counterbore therefor in the upper face of lower baffle plate 64. Thus when threaded bolt 61 is turned it will raise or lower spaced baffles 64 and 65. A lock nut 70 on the stem of adjustable bolt 61 is utilized to secure the bolt in adjusted position. Fig. 5 illustrates the adjustment of lower baffle plate 64 for normal operation in a converter on a vehicle operating in a hilly section where the converter will be frequently tilted. When the converter is subjected to slight or infrequent tilting, the adjustment will usually be changed to dispose baffle plate 64 with its lower face even with or even somewhat above the lower face of upper grid 57 of the catalyst chamber.

When the converters illustrated are assembled the catalyst chambers formed by the spaced parallel grids should be filled to the desired extent with suitable catalyst in discrete form. Pelleted catalysts of uniform size are preferred. While catalyst in plug or cylindrical form can often be used, spherical catalyst pieces give the best operation within the catalyst chambers as well as in feeding through the baffled openings from the catalyst reservoirs or hoppers. While such feed openings may be mere gaps in the baffle plates as illustrated in the drawings, they may take the form of slots or holes of suitable size to pass the individual pieces of catalyst as needed but such openings should not be in line, otherwise the pressure of the reserve body of catalyst may force catalyst into the chamber until the latter is tightly packed. The extent of free space required to insure vibration of the layer of catalyst extending across the catalyst chamber is from 2 per cent to about 10 per cent of the volume of space for catalyst below the final feed openings from the hopper or hoppers supplying such space. Feeding the reactants beneath the catalyst layer as illustrated is desirable since it tends to keep the pieces of catalyst partly suspended in the gaseous stream and thus to assist any vibratory movement imparted by the engine, or by the vehicle upon which the converter may be mounted. Continuous rubbing and turning of the individual pieces of catalyst over and upon one another is essential to prevent fouling of the active surfaces of the catalyst and to insure a good catalytic operation.

Any suitable or desired catalysts, if in proper physical form, may be utilized. For oxidizing operations pellets or molded pieces (preferably spherical) of alumina (catalyst grade) may be impregnated with finely divided oxidizing catalyst such as elements of the platinum group of the periodic table, or silver, or copper, etc. In the presence of oxygen such catalysts promote oxidation of carbon monoxide and other burnable components at operating temperatures in the range of about 500° F. to about 1800° F. It is desirable that the catalyst have sufficient strength and compactness to withstand the vibrating, rubbing and rolling action essential to the maintenance of clean and catalytically active surfaces. When very hard pellets highly resistant to abrasion are utilized in equipment for engines which are used more or less infrequently, hoppers for feeding additional catalyst may be omitted since a layer of such pellets will operate for several hundred hours with relatively slight loss from attrition, as of the order of 2 per cent in 500 hours of operation. Transverse partitions such as indicated at 23 in Fig. 3 should be provided to avoid possibility of by-passing.

For trucks, busses, and other vehicles and engines in substantially constant use under severe operating conditions there should be a sufficient reserve supply of catalyst to maintain the layers of catalyst at uniform volume so as to minimize attrition losses and to insure a sustained and efficient catalytic reaction. The baffled feeding arrangements herein disclosed automatically add catalyst to the operating layer piece by piece only as surface wear makes room for additional catalyst. They effectively hold back the reserve supply and prevent the catalyst chamber from becoming tightly packed with catalyst.

The catalyst chambers may range in depth from about one-half inch to about two inches (1.25 cm. to 5 cm); the individual pieces of catalyst may be from 2 to 6 mm. in diameter. The quantity of catalyst required is a function of the piston displacement of the engine and should range from 5 to 15 cc. of catalyst per cubic inch of piston displacement, depending upon the activity of the unstable oxides of the catalytic metals chosen for the reaction. For example, for an engine having a piston displacement of 350 cubic inches and utilizing a molded alumina platinum catalyst (spherical) of 4 mm. diameter, some 2450 cc. of catalyst is required. This can be disposed in a cylindrical converter such as illustrated in Figs. 1–3 of 15 cm. diameter in a chamber 3 cm. in depth and 57 cm. in length, the volume of such chamber being 2565 cc. Any hoppers mounted on the converter will have restricted catalyst feeding means arranged or adjusted to maintain the catalyst in the chamber uniformly at or about 2450 cc. A larger catalytic chamber and greater amounts of catalyst are required when less active substances than platinum are utilized for the oxidizing reaction. Inlet and outlet conduits to and from the converter are such as to provide a velocity of the reactants, calculated at 60° F., at entry to the bed or layer of catalyst not exceeding one and a half feet per second at idling speed of the engine. For best results such velocity at idling speed is in the range of about one-half to about one foot per second. It will be obvious that if the velocity of reactants is too high, either at idling speed or at high speed, the pressure drop in the bed or layer of catalyst will be excessive, thus preventing the venturi from operating to supply oxygen for the reaction. Furthermore a high velocity of reactants under idling conditions brings the catalyst to the temperature of the reactants which is usually of the order of 300 to 400° F. and below the temperature of the reaction.

Single stage operation as indicated in Figs. 1–3 is adequate in most instances. However, when necessary or desirable the reaction can be effected in a highly satisfactory manner in multiple stages in a single converter after the manner illustrated in Fig. 4. Moreover both process and apparatus aspects of the present invention are useful for other catalytic reactions as will be apparent to those skilled in the art of catalysis. Hence it is to be understood that the invention is not to be limited to the specific details of apparatus and process described herein by way of illustration, but includes all changes, modifications and adaptations within the scope of the appended claims.

I claim as my invention:

1. A catalytic device for use with vehicles and the like powered by internal combustion engines for eliminating obnoxious components of exhaust gases therefrom comprising a chamber for catalyst particles fastened to said vehicle and adapted to provide a substantially horizontal layer of catalyst particles exposed to the flow of exhaust gases, a catalyst hopper extending generally vertically from said catalyst chamber and having an opening at its lower end arranged so as to permit catalyst particles to flow by gravity from said hoper into said chamber to replace catalyst lost by attrition, means comprising horizontal, stationary baffle plates located at said opening for supporting the column of fresh catalyst in said hopper and for restricting the flow of catalyst through said opening, said baffle plates being spaced vertically from one another and each extending partially across said opening in such manner as to provide restricted discharge ports out of line with one another through which fresh catalyst from said hopper may flow by gravity into said chamber, thereby keeping said chamber substantially filled with catalyst particles but at the same time avoiding tight packing thereof, whereby said particles are free to vibrate slightly in response to the vibration of said vehicle but are protected from violent impact otherwise ocassioned by failure to maintain said catalyst chamber sufficiently full.

2. A catalytic device in accordance with claim 1 in which the position of said horizontal baffle plates may be adjusted so as to adapt the mode of feeding fresh catalyst particles from said hopper to said chamber to the conditions prevailing from time to time in the use of the vehicle.

3. A catalytic device adapted for use with vehicle powered by internal combustion engines for eliminating obnoxious components of exhaust gases therefrom comprising a housing fastened to said vehicle, a chamber for catalyst particles arranged within such housing, said chamber being defined by a pair of horizontally disposed parallel, spaced apart, foraminous grids, and being adapted to contain a relatively shallow layer of catalyst particles exposed to the flow of exhaust gases, a catalyst hopper extending generally vertically from said catalyst chamber and having an opening at its lower end arranged so as to permit catalyst particles to flow by gravity from said hopper into said chamber to replace catalyst lost by attrition, means comprising horizontal, stationary baffle plates located at said opening for supporting the column of fresh catalyst in said hopper and for restricting the flow of catalyst through said opening, said baffle plates being spaced vertically from one another and each extending partially across said opening in such manner as to provide restricted discharge ports out of line with one another through which fresh catalyst from said hopper may flow by gravity into said chamber, thereby keeping said chamber substantially filled with catalyst particles but at the same time avoiding tight packing thereof, whereby said particles are free to vibrate slightly in response to the vibration of the vehicle but are protected from violent impact otherwise ocasioned by failure to maintain said catalyst chamber sufficiently full.

4. A catalytic device adapted for use on vehicles powered by internal combustion engines for eliminating obnoxious components of exhaust gases therefrom, comprising an elongated housing fastened to said vehicle, an elongated chamber for catalyst particles arranged within said housing, said chamber being defined by a pair of horizontally disposed parallel, spaced apart, foraminous grids adapted to contain between them a relatively shallow layer of catalyst particles, exposed to the flow of exhaust gases, said chamber being provided with vertical partitions arranged transversely thereof at intervals along its length for preventing excessive displacement of said catalyst particles in said chamber during tilting and violent movement of said device when in use on said vehicle, a catalyst hopper extending generally vertically from said catalyst chamber and having an opening at its lower end arranged so as to permit catalyst particles to flow by gravity from said hopper into said chamber to replace catalyst lost by attrition, means comprising horizontal, stationary baffle plates located at said opening for supporting the column of fresh catalyst in said hopper and for restricting the flow of catalyst through said opening, said baffle plates being spaced vertically from one another and each extending across said opening in such manner as to provide a restricted horizontal passage communicating with said hopper and said catalyst chamber respectively by restricted discharge ports out of line with one another through which fresh catalyst from said hopper may flow by gravity into said chamber, thereby keeping said chamber substantially filled with catalyst particles but at the same time avoiding tight packing thereof, whereby said particles are free to vibrate slightly in response to the vibration of the vehicle but are protected from violent impact otherwise occasioned by failure to maintain said catalyst chamber sufficiently full.

5. In a catalytic device subject to constant movement and vibration when in use and including a catalyst chamber providing a generally horizontal layer of catalyst particles exposed to the flow of reactants, means for feeding fresh catalyst particles into said chamber to replace catalyst lost by attrition comprising a catalyst hopper extending generally vertically from said catalyst chamber and having an opening at its lower end arranged so as to permit catalyst particles to flow by gravity from said hopper into said chamber, means comprising horizontal, stationary baffle plates located at said opening for supporting the column of fresh catalyst in said hopper and for restricting the flow of said catalyst through said opening, said baffle plates being spaced vertically from one another and each extending partially across said opening in such manner as to provide a restricted horizontal passage communicating with said hopper and said catalyst chamber respectively by restricted discharge ports out of line with one another through which fresh catalyst from said hopper may flow by gravity into said chamber, thereby keeping said chamber substantially filled with catalyst particles but at the same time avoiding tight packing thereof, whereby said particles are free to vibrate slightly, but are protected from violent impact otherwise occasioned by failure to maintain said catalyst chamber sufficiently full.

6. In a catalyst device subject to constant movement and vibration when in use and including a catalyst chamber providing a generally horizontal layer of catalyst particles exposed to the flow of reactants, means for feeding fresh catalyst particles into said chamber to replace catalyst lost by attrition comprising a catalyst hopper extending generally vertically from said catalyst chamber and having an opening at its lower end arranged so as to permit catalyst particles to flow by gravity from said hopper into said chamber, means comprising horizontal, stationary baffle plates located at said opening for supporting the column of catalyst in said hopper and for restricting the flow of catalyst through said opening, said baffle plates being spaced vertically from one another and each extending partially across said opening in such manner as to provide a restricted horizontal passage communicating with said hopper and said catalyst chamber respectively by restricted discharge ports out of line with one another through which fresh catalyst from said hopper may flow by gravity into said chamber, thereby keeping said chamber substantially filled with catalyst but at the same time avoiding tight packing thereof, whereby said partciles are free to vibrate slightly but are protected from violent impact otherwise occasioned by failure to maintain said catalyst chamber sufficiently full.

References Cited in the file of this patent

UNITED STATES PATENTS

| Number | Name | Date |
|---|---|---|
| 806,866 | Bonchand-Praceiq | Dec. 12, 1905 |
| 1,030,508 | Eschellmann et al. | June 25, 1912 |
| 1,522,111 | Franck-Philipson | Jan. 6, 1925 |
| 1,836,166 | Heckenbleikner et al. | Dec. 15, 1931 |
| 1,840,186 | Courtney et al. | Jan. 5, 1932 |
| 1,867,325 | Neville | July 12, 1932 |
| 2,071,119 | Harger | Feb. 16, 1937 |
| 2,229,166 | Brandt | Jan. 21, 1941 |
| 2,240,347 | Page et al. | Apr. 29, 1941 |
| 2,246,654 | Arveson | June 24, 1941 |
| 2,251,000 | Pyzel | July 29, 1941 |
| 2,312,006 | Thiele | Feb. 23, 1943 |
| 2,395,263 | Foster | Feb. 19, 1946 |
| 2,534,092 | Wilde | Dec. 12, 1950 |
| 2,605,234 | Friedman | July 29, 1952 |